(12) United States Patent
Hall et al.

(10) Patent No.: US 6,408,873 B1
(45) Date of Patent: Jun. 25, 2002

(54) PISTON-TYPE FLUSH VALVE HAVING A TRIPLE FILTERED BYPASS

(75) Inventors: David C. Hall, Wheaton; Martin E. Marcichow, Hoffman Estates, both of IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/625,033

(22) Filed: Jul. 24, 2000

(51) Int. Cl.[7] .......................... F16K 31/385; E03B 7/07
(52) U.S. Cl. .......................................... 137/550; 251/40
(58) Field of Search .......................... 251/40; 137/544, 137/550; 210/335, 336, 342, 418, 428

(56) References Cited

U.S. PATENT DOCUMENTS

| 1,114,398 | A | 10/1914 | Sloan |
| 1,416,317 | A | 5/1922 | Banta |
| 1,556,442 | A | 10/1925 | Holcomb et al. |
| 2,012,255 | A | 8/1935 | Binnall |
| 2,153,904 | A | 4/1939 | Wilson |
| 2,406,259 | A | 8/1946 | Russell et al. |
| 3,207,467 | A | 9/1965 | Buhler |
| 3,279,742 | A | 10/1966 | Billeter |
| 4,261,545 | A | 4/1981 | Allen |
| 5,415,374 | A | 5/1995 | Carroll et al. |
| 5,476,244 | A | 12/1995 | Carroll et al. |
| 5,887,848 | A | 3/1999 | Wilson |
| 5,967,182 | A | 10/1999 | Wilson |
| 6,182,689 | B1 * | 2/2001 | Lauer et al. ................. 137/550 |
| 6,216,730 | B1 * | 4/2001 | Hall ........................... 137/550 |
| 6,260,576 | B1 * | 7/2001 | Allen ......................... 137/550 |

* cited by examiner

*Primary Examiner*—Kenneth Bomberg
*Assistant Examiner*—Eric Keasel
(74) *Attorney, Agent, or Firm*—Cook, Alex, McFarron, Manzo, Cummings & Mehler, Ltd.

(57) ABSTRACT

A flush valve for use with urinals or water closets includes a hollow valve body having an inlet, an outlet, and a valve seat therebetween. There is a piston assembly movable in the hollow valve body to a closing position on the valve seat to control flow through the valve. A pressure chamber is above the piston assembly for holding it on the valve seat. There is a bypass passage to the piston assembly to connect the inlet with the pressure chamber to provide fluid to move the piston assembly to the closing position. The bypass passage includes a filter and an orifice, with the filter including multiple filters in series between the inlet and the bypass.

8 Claims, 3 Drawing Sheets

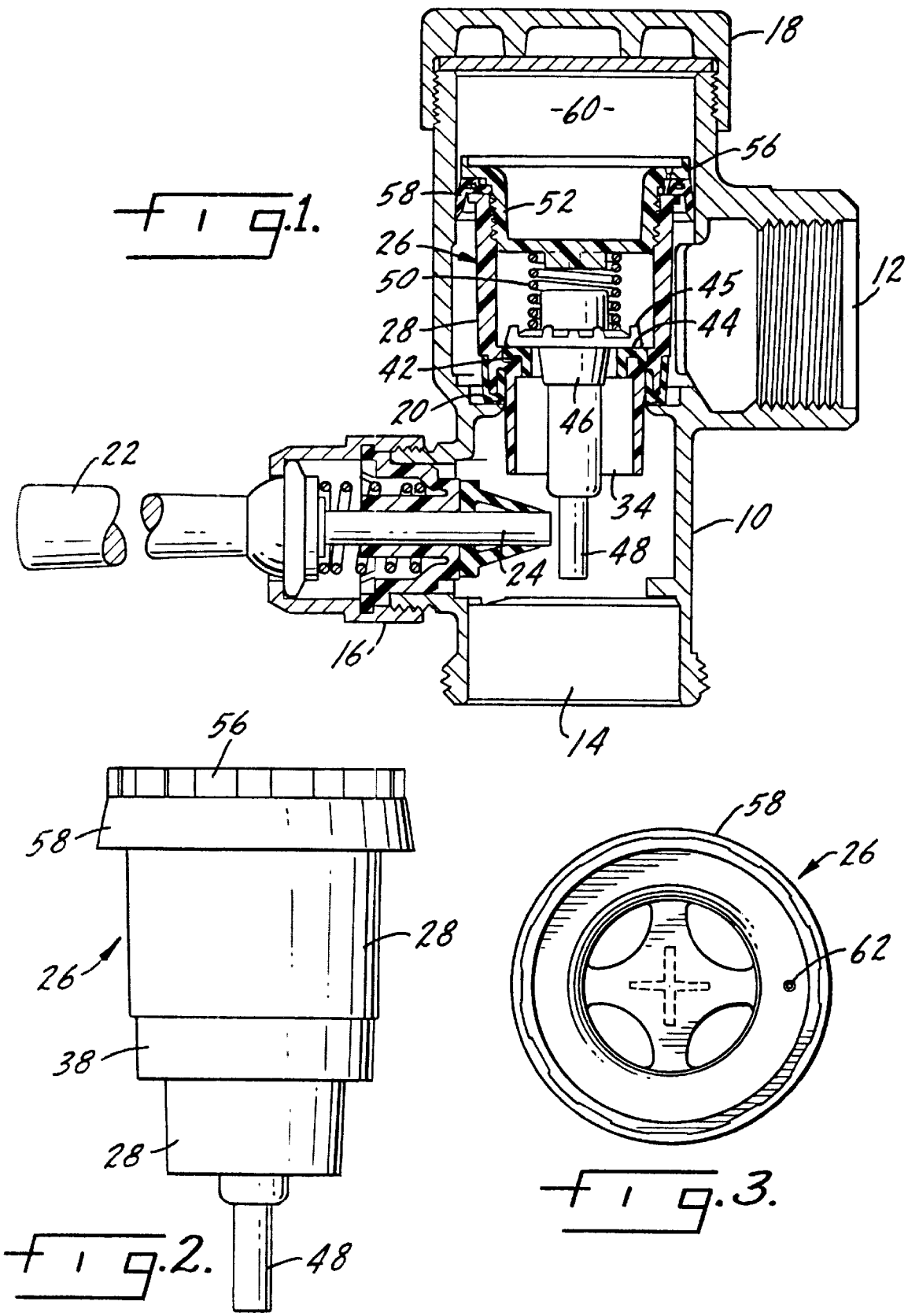

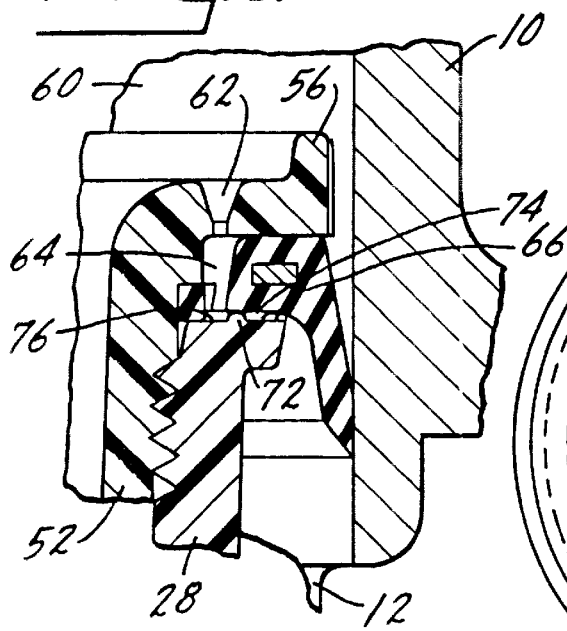
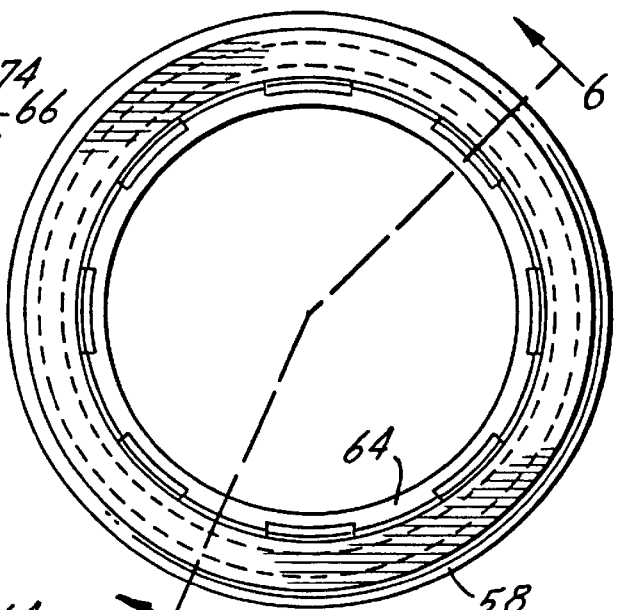
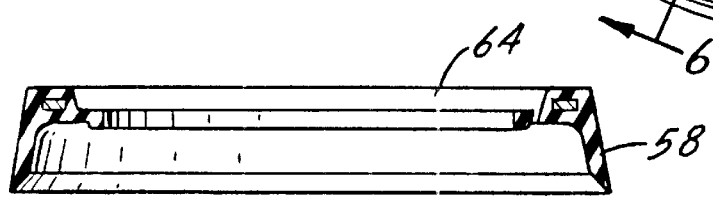
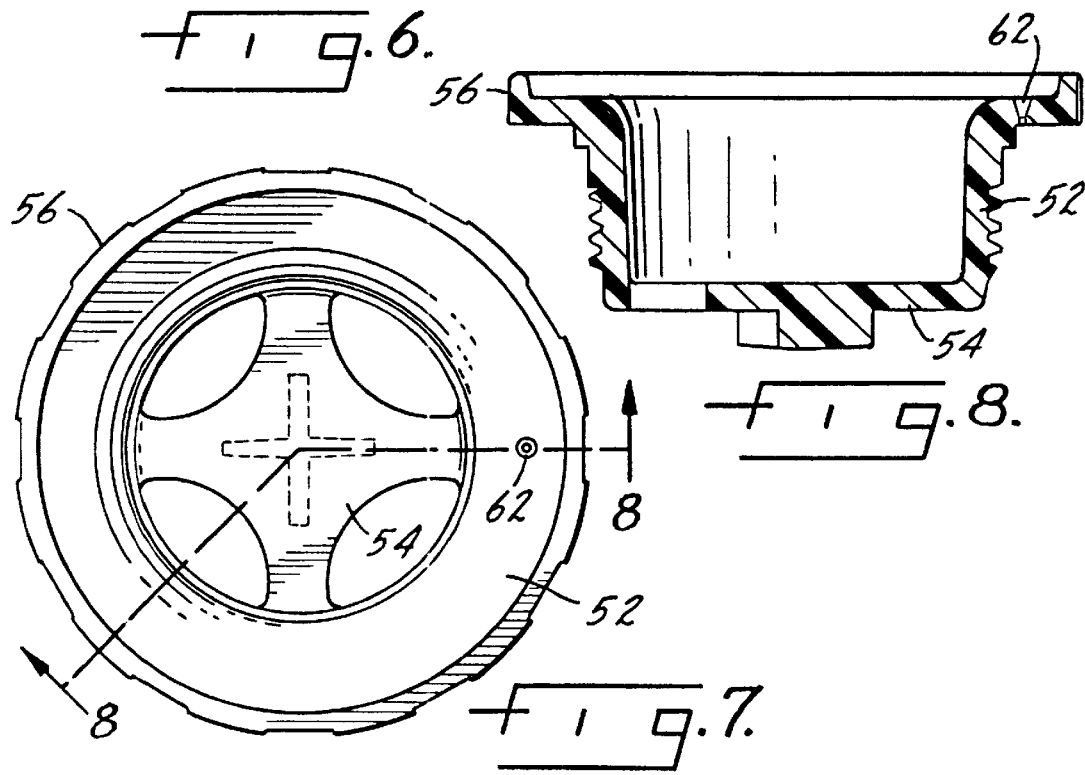

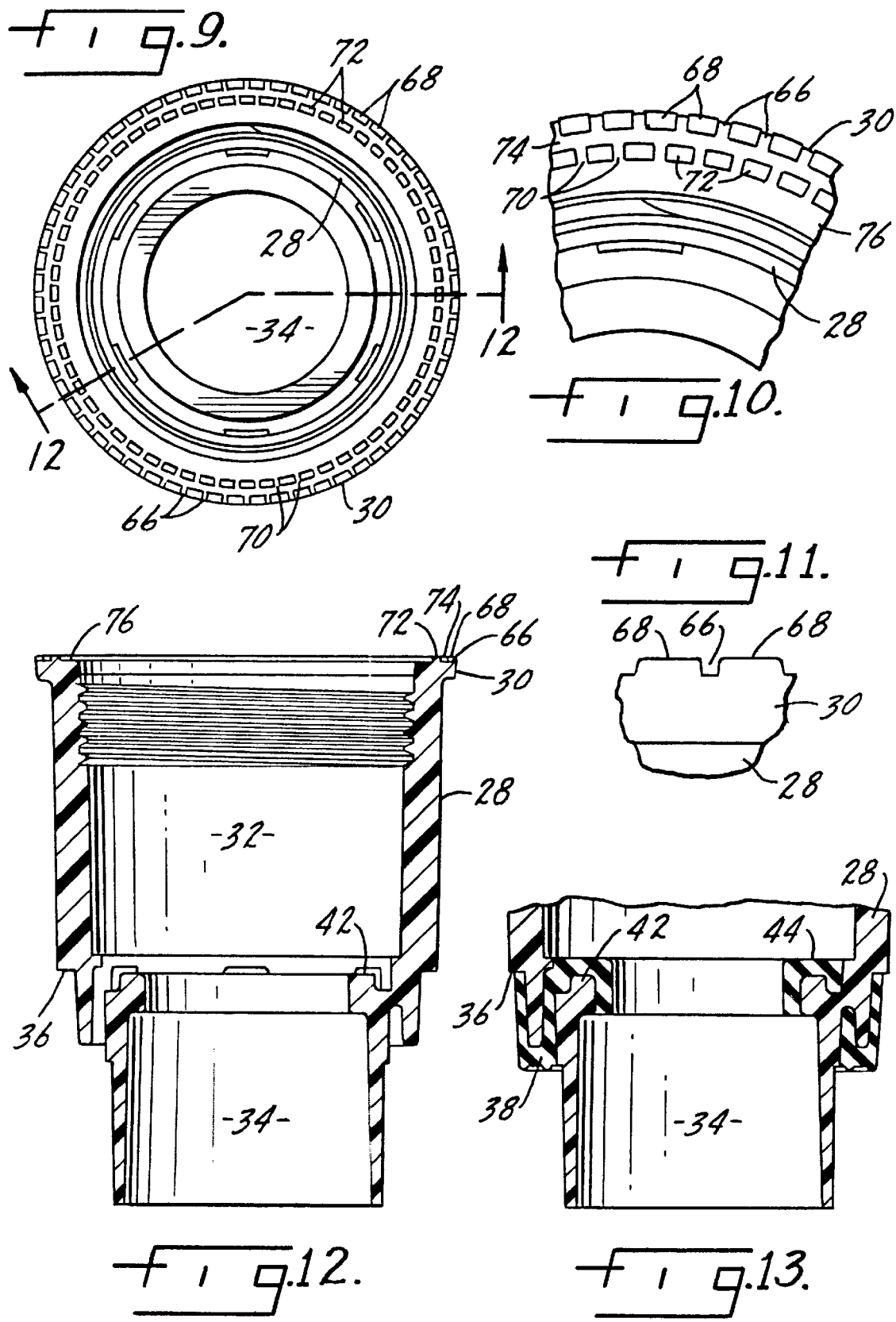

PISTON-TYPE FLUSH VALVE HAVING A TRIPLE FILTERED BYPASS

Field of the Invention

The present invention relates to piston-type flush valves for use on a commode or a urinal and more specifically to a piston-type flush valve having a filter and bypass orifice with multiple filters in fluid flow series.

BACKGROUND OF THE INVENTION

Piston-type flush valves such as the flush valve shown in U.S. Pat. No. 4,261,545 have used a filtered bypass orifice through the piston assembly. The bypass provides inlet fluid pressure above the piston for closing and then holding the piston assembly on the valve seat after the flush operation. The orifice is sized to allow a predetermined amount of fluid flow through the flush valve before the valve closes. The filter prevents the small bypass orifice from clogging with particulate from the fluid inlet and is configured to allow sufficient fluid to flow through the orifice even after portions of the filter becomes clogged with trapped particulate or sediment.

One disadvantage of the aforementioned flush valve in the '545 patent is that the filter has a single stage and can allow irregularly-shaped particulates to pass through which may later clog the downstream orifice.

Another disadvantage is that only a limited number of parallel filtering grooves are provided upstream of the orifice. The parallel grooves 78, as shown in FIG. 3 of the patent, are molded perpendicular to the parting line of the mold for the piston cylinder. When this limited number of filtering grooves become significantly clogged with sediment, the flush valve must be disassembled so the filter can be cleaned.

Another disadvantage of the above noted flush valve is that the orifice is a horizontal hole molded through the mid-section of the molded piston cylinder. Therefore, the orifice must be molded using a core pin, which increases the complexity of the molding process. Since the size of the metering restriction in the orifice determines the amount and rate of fluid flow through the flush valve, to change the flow rate, a different piston cylinder with a different size orifice must be provided.

SUMMARY OF THE INVENTION

The present invention provides a multiple stage filter and readily replacable bypass orifice for a piston-type flush valve in which the individual openings in the filter are smaller than the restriction in the bypass orifice to prevent the orifice from clogging due to particles in the water.

The present invention provides a plurality of individual filtering slots in multiple concentric arrays upstream of the orifice.

The present invention provides a bypass orifice member in which the size of the metering restriction in the orifice member may be readily changed without changing the piston so as to vary the amount and rate of water that flows through the flush valve during each flush operation.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, of a piston-type flush valve according to the present invention;

FIG. 2 is a side view of the piston assembly;

FIG. 3 is a top view of the piston assembly;

FIG. 4 is an enlarged vertical cross-section of the piston assembly illustrating the bypass orifice and filtering means;

FIG. 5 is a top view of the lip seal;

FIG. 6 is a sectional view of the lip seal along section 6—6 of FIG. 5;

FIG. 7 is a top view of the piston insert;

FIG. 8 is a sectional view of the piston insert along section 8—8 of FIG. 7;

FIG. 9 is a top view of the piston;

FIG. 10 is an enlarged top view of the piston rim;

FIG. 11 is an enlarged side view of a slot in the piston rim;

FIG. 12 is a sectional view of the piston along section 12—12 of FIG. 9; and

FIG. 13 is a sectional view of the piston showing the over molded piston seat and relief valve seat.

DESCRIPTION OF THE PREFERRED EMBODIMENT

This invention relates to a multiple stage filter for use with a bypass orifice in a piston-type flush valve or other plumbing equipment. A piston-type flush valve according to the present invention is shown in FIG. 1, and has a generally hollow body 10 which includes an inlet connection 12, an outlet connection 14, and a handle coupling connection 16. The top of the valve body is closed by a cover 18. A main valve seat 20 is formed on the interior walls of the valve body between the inlet and the outlet.

The valve is actuated by an operating handle 22 which is fastened to the valve body at the handle coupling connection. The handle is connected to a plunger 24 which extends into the interior portion of the valve body. Further details of the handle and its operation are shown in the '545 patent, the disclosure of which is herein incorporated by reference.

The piston assembly, indicated generally at 26, is adapted to reciprocate within the valve body. The piston assembly includes a hollow, generally cylindrical piston 28 shown separately in FIGS. 9–13. The piston 28 has an annular rim 30 at the open top and an interior piston chamber 32. The bottom 34 of the piston is open.

The piston also has an inwardly stepped shoulder 36 at a intermediate exterior surface. The annular exterior shoulder supports the main valve seal 38 which seals on and closes the main valve seat 20 to control fluid flow through the flush valve. The interior surface of the stepped shoulder also defines an annular ledge 42 which supports a relief valve seat 44.

As shown in FIG. 13, both the main valve seal 38 and the relief valve seat 44 are molded directly onto the exterior stepped shoulder 36 and the interior annular ledge 42 of the piston cylinder by an over-molding process. Over-molding both the main valve and relief valve sealing surfaces allows for looser tolerances in molding the piston while improving the overall sealing of the flush valve.

The piston assembly also includes a relief valve 46 which normally closes the bottom open end 34 of the piston. The relief valve has a collar 45 which engages the relief valve seat 44 on the annular ledge of the piston. An operating stem 48 is slidable in the central, hollow portion of the relief valve. The operating stem extends to a point adjacent the plunger 24. A spring 50 assists in holding the relief valve 46 in its sealing position.

The piston assembly 26 further includes a piston insert 52 shown in FIGS. 7 and 8. The piston insert is threaded into the upper interior wall of the piston cylinder below the rim. One end of the spring 50 abuts against a central stop 54 in the piston insert. The piston insert also has a annular flange 56 extending outward at the top edge of the insert.

The piston insert flange clamps a lip seal 58 between the top rim of the piston and the piston insert. The lip seal 58, shown in FIGS. 4, 5 and 6, is held between the piston insert and the top rim of the piston cylinder to provide a slidable seal to define the pressure chamber 60 above the piston assembly.

The piston insert has a bypass orifice 62 vertically orientated in the radial annular flange 56 to provide fluid communication to the piston pressure chamber 60. The bypass 62 has a small diameter, on the order of 0.02", which is susceptible to clogging by sedimentary deposits and the like found in water running through the valve. The vertical orientation of the orifice with the opening facing the bottom of the flange of the piston insert reduces the potential for particulate clogging the orifice. Also, the vertical orientation allows the orifice to be more easily injection molded rather than using core pins for the radial orientation of previous orifice.

The operation of the flush valve requires that the bypass orifice remain completely free of any debris which may be found in the water. The present invention accomplishes this by providing a filter which is simple to manufacture and maintain and also effective in operation. Referring to FIGS. 4 and 9, the present invention provides a maze-like path that provides triple filtering for water flowing from the inlet 12 to the annular chamber 64 which feeds the bypass orifice. As shown in more detail in the enlarged view of FIG. 10, water from the inlet 12 flows radially inward through a first set of slots 66 formed by a first outer concentric array of molded vertical protrusions 68 in the piston 28. A second set of radially slots 70 is formed by a second inner concentric array of molded vertical protrusions 72 radially inward from the first set. The radial slots 70 in the second array are radially offset from the first radial slots 66. An annular passage 74 is formed between and connects the first and second slots.

The filter slots are sized to sequentially filter any particles which could clog the bypass orifice. Preferably, the filter slots are sequentially sized so as to sequentially filter out increasingly smaller particles. Thus, the inner radial slots 70 preferably are smaller than the annular passage 74, which is preferably smaller than the outer radial slots 66. To be effective, at least one of the set of slots, preferably the inner radial slots 70, must be smaller than the orifice. The combination of radial slots 66 (the first filter), the annular passage 74 (the second filter), and the inner radial slots (70) form a three-stage filter which communicates with the annular settling chamber 76, which in turn is open to the bypass orifice 62.

The flush valve operates as follows: In the normal closed position of the flush valve, the inlet water pressure surrounds the exterior of the piston and passes into the annular chamber 76 and into the pressure chamber through the bypass 62. Because the area on the top of the piston assembly is greater than the area around the valve seat, the pressure differential holds the piston firmly closed on the valve seat. When the operating handle is moved in any direction it forces the plunger inward against the relief valve stem, thereby tilting the relief valve off the relief valve seat. The inlet fluid pressure in the pressure chamber is relieved through the lower opening in the piston cylinder into the outlet of the flush valve. The inlet water flow can now raise the piston assembly off the valve seat, permitting full water flow from the inlet to the outlet.

Even if the operating handle is operated for an unduly long time, the flush valve will perform the flushing cycle in a predetermined time and shutoff. The lower end of the relief valve stem will rest on top of the plunger and telescope within the hollow portion of the relief valve. The relief valve then closes on the relief valve seat, assisted by the spring and gravity, thereby closing off the pressure chamber from the inlet opening. This permits the differential pressure to create flow into the pressure chamber through the bypass orifice, slowly forcing the piston assembly downward and finally closing the valve seat to again shut off the water flow.

The invention is specifically directed to the triple or three-stage filter formed in the piston. Water passing through this filter array of decreasingly sized passage flows to an annular chamber defined between the piston, piston insert and seal 58. The chamber 76 opens to the vertically oriented bypass 62. One advantage of the present invention is that the piston can be formed without the need for close tolerance. The full circumferential array of slots allows for some slots to be clogged without substantial loss of fluid flow through the slots.

Another advantage of the present invention is that the flow rate through the bypass can be readily changed by providing a piston insert with a different diameter orifice. This allows the flow rate to be set during the initial manufacture of the valve or to be later changed by replacing only the insert in the field.

Whereas the preferred form of the invention has been shown and described herein, it should be realized that there may be many modifications, substitutions and alterations thereto within the scope of the following claims.

What is claimed is:

1. A flush valve for use with urinals or water closets including:
   a hollow valve body having an inlet, an outlet and a valve seat between the inlet and the outlet;
   a piston assembly movable in said hollow valve body to a closing position on said valve seat to control fluid flow between said inlet and said outlet;
   a pressure chamber above the piston assembly for holding said piston assembly on said valve seat; and
   a bypass passage through said piston assembly to fluidly connect said inlet with said pressure chamber to provide fluid to move said piston assembly to said closing position, the bypass passage including filtering means and an orifice, said filtering means including multiple filters in fluid flow series connecting said inlet with said orifice, said multiple filters including a plurality of individual filtering slots disposed in a plurality of concentric annular arrays, the cross sectional opening of the individual filtering slots in each annular array being smaller than the cross sectional openings of the individual filtering slots of the concentrically adjacent array of filtering slots, the individual filtering slots in the annular arrays being radially oriented and circumferentially offset from the individual filtering slots in the concentrically adjacent annular array of filtering slots.

2. The flush valve of claim 1 wherein the cross-sectional opening of the individual filtering slots in at least one annular array of slots is smaller than the cross-sectional opening of the orifice.

3. The flush valve of claim 1 wherein the cross-sectional opening of the individual filtering slots in at least one annular array of slots is smaller than the cross-sectional opening of the orifice.

4. The flush valve of claim 1 wherein said orifice is vertically oriented.

5. The flush valve of claim 1 wherein the piston assembly includes a piston cylinder having a top rim, said multiple filters in series being formed in said top rim.

6. The flush valve of claim 1 wherein the plurality of concentric annular arrays of individual filtering slots comprise an inner array and an outer array wherein the individual filtering slots in the inner and outer array are radially directed and circumferentially offset from each other and an annular chamber connecting the inner and outer array of slots.

7. The flush valve of claim 6 wherein said bypass passage further includes an annular chamber coaxially with and concentrically inside of said inner array of slots, said annular chamber being in communication with said orifice.

8. A flush valve for use with urinals or water closets including:

a hollow valve body having an inlet, an outlet and a valve seat between the inlet and the outlet;

a piston assembly movable in said hollow valve body to a closing position on said valve seat to control fluid flow between said inlet and said outlet;

a pressure chamber above the piston assembly for holding said piston assembly on said valve seat; and a bypass passage through said piston assembly to fluidly connect said inlet with said pressure chamber to provide fluid to move said piston assembly to said closing position, the bypass passage including filtering means and an orifice, said filtering means including multiple filters in fluid flow series connecting said inlet with said orifice, said multiple filters including a plurality of individual filtering slots disposed in a plurality of concentric annular arrays, the cross sectional opening of the individual filtering slots in each annular array being smaller than the cross sectional openings of the individual filtering slots of the concentrically adjacent array of filtering slots, the plurality of concentric annular arrays of individual filtering slots comprise an inner array and an outer array wherein the individual filtering slots in the inner and outer array are radially directed and circumferentially offset from each other, and an annular chamber connecting the inner and outer array of slots.

* * * * *